(12) United States Patent
Song et al.

(10) Patent No.: US 7,882,031 B2
(45) Date of Patent: Feb. 1, 2011

(54) ANTI-CRIMES FINANCIAL NETWORK

(76) Inventors: Yuh-shen Song, 19848 Turtle Springs Way, Northridge, CA (US) 91326;
Catherine Lew, 19848 Turtle Springs Way, Northridge, CA (US) 91326;
Alexander Song, 19848 Turtle Springs Way, Northridge, CA (US) 91326;
Victoria Song, 19848 Turtle Springs Way, Northridge, CA (US) 91326

( * ) Notice: Subject to any disclaimer, the term of this patent is extended or adjusted under 35 U.S.C. 154(b) by 0 days.

(21) Appl. No.: 12/869,688

(22) Filed: Aug. 26, 2010

(65) Prior Publication Data

US 2010/0325026 A1    Dec. 23, 2010

Related U.S. Application Data

(63) Continuation of application No. 11/259,374, filed on Oct. 25, 2005, now Pat. No. 7,805,369.

(60) Provisional application No. 60/660,158, filed on Mar. 10, 2005.

(51) Int. Cl.
*G06Q 40/00*    (2006.01)

(52) U.S. Cl. .............................. 705/44; 705/38; 705/39; 705/40

(58) Field of Classification Search .............. 705/38–44
See application file for complete search history.

(56) References Cited

U.S. PATENT DOCUMENTS

| 2002/0143704 | A1* | 10/2002 | Nassiri | 705/51 |
| 2003/0177087 | A1* | 9/2003 | Lawrence | 705/38 |
| 2003/0233319 | A1* | 12/2003 | Lawrence | 705/39 |
| 2005/0149439 | A1* | 7/2005 | Suisa | 705/44 |

* cited by examiner

*Primary Examiner*—James A Kramer
*Assistant Examiner*—Hao Fu
(74) *Attorney, Agent, or Firm*—Seyfarth Shaw LLP

(57) ABSTRACT

A computerized system is established through a network to help business organizations conduct and manage their businesses with anti-financial crimes provisions according to the government regulations and laws, e.g., the Bank Secrecy and the USA PATRIOT Act, and to enable financial institutions to monitor and manage these business organizations with confidence in compliance with the regulatory requirements and applicable laws.

1 Claim, 5 Drawing Sheets

ANTI-CRIMES FINANCIAL NETWORK

CROSS REFERENCE TO RELATED APPLICATIONS

This application is a continuation of prior application Ser. No. 11/259,374, to Song et al., filed Oct. 25, 2005, which claims the benefit of U.S. Provisional Application No. 60/660,158, to Song et al., filed Mar. 10, 2005, the disclosures of which are expressly incorporated by reference herein in their entireties.

FIELD OF INVENTION

The present invention relates generally to doing business in compliance with anti-financial crimes regulatory requirements. More specifically, the present invention uses computer network technology with anti-money laundering, anti-terrorist financing, and anti-fraud measures to establish businesses, which can effectively and efficiently provide goods or services to the customers and easily cooperate with their financial institutions to comply with the regulatory requirements and applicable laws.

BACKGROUND OF THE INVENTION

In the past few years, governments worldwide have established several new policies to prevent financial crimes. A number of businesses, such as money services businesses ("MSB"), travel agencies, jewelry stores, pawnshops, etc., have to comply with regulatory rules and requirements for the purpose of anti-money laundering, anti-terrorist financing and anti-fraud.

In order to explain the present invention in detail, we will use MSB in the USA as an example in this document. However, the present invention applies to other businesses as well.

Money services, such as check cashing, money transfer, foreign currency exchange, selling stored value cards, are very popular today. Even in some grocery stores or supermarkets, money services are often offered to attract customers or to subsidize the fee income to the business.

Starting from 2002, the US government requires money services businesses (MSB) to register with the government periodically and to cooperate with the government agencies for the purposes of preventing crimes. Since it is very difficult for the government agencies to identify and monitor these tens of thousands of MSBs across the nation, the government agencies have skillfully transferred this huge task to financial institutions, which often have MSBs as their clients.

In the April of 2005, bank regulators such as Federal Reserve Bank (FRB), Federal Deposit Insurance Corporation (FDIC), Office of Comptroller of Currency (OCC), and Office of Thrift Supervision (OTS) issued a joint statement, confirming the requirement that a financial institution has to file a Suspicious Activity Report (SAR) if the financial institution knows that its MSB client has violated any law.

MSBs have to comply with many legal requirements. For example, MSBs have to comply with the requirement issued by the Office of Foreign Assets Control (OFAC), which prohibits MSBs from conducting business with any entity on the blacklist published by the OFAC periodically. According to the Bank Secrecy Act, an MSB is required to file a Currency Transaction Report (CTR) if any of its clients has conducted transactions for more than $10,000 in cash on the same day. An MSB has to file Suspicious Activity Report (SAR) if any of its clients conducts any suspicious activity, including the structured activities that attempt to avoid the filing of a CTR by the MSB.

According to the USA PATRIOT Act, an MSB has to authenticate the identity of a client before conducting any transaction for the client. In addition, an MSB has to periodically register with government agencies. In order to determine whether its MSB client has complied with the applicable laws, a financial institution has to use a tremendous amount of effort to monitor, detect, and report suspicious activities about the MSB and the MSB's customers. For example, to verify whether an MSB has checked its customers against the OFAC list as required by law, a financial institution may have to check all the payees of those checks deposited by an MSB against the OFAC list.

Currently, many financial institutions use a manual process to examine, for example, every check deposited by the MSBs. This expensive manual process is not even sufficient because cashing checks is just one of the many possible money services. An MSB can typically cash checks, advance cash, transfer money, exchange foreign currency, issue money order, sell stored value card, etc. It is practically impossible for financial institutions to monitor all of these activities.

Most small businesses (e.g., grocery stores, travel agencies, etc.) have very limited capabilities to comply with regulatory requirements and applicable laws. In fact, most business owners do not even know what they have to do in order to comply with the evolving regulatory requirements and applicable laws.

At the same time, financial institutions are under heavy regulatory pressure to monitor and manage these business clients and file SARs for any violation of laws. In the recent years, government agencies often issued a huge monetary penalty to a financial institution, which fails to comply with the regulatory requirements and applicable laws.

For example, AmSouth Bank was fined $50 million for failure to file SARs as required by laws; Riggs Bank was fined $25 million for failure to file SARs; UBS was fined $100 million for failure to comply with the requirements set by the Office of Foreign Assets Control. As a result, financial institutions are very concerned about how to monitor and manage business clients in order to comply with the regulatory requirements.

In reality, it is extremely difficult, if not impossible, for a financial institution to monitor and manage any business client because a financial institution has no idea what has been transacted between a business and its own clients. As a result, many financial institutions charge their MSB clients very high service fees in order to compensate their compliance expenses and risks. Under the regulatory pressure, some financial institutions do not even want to deal with MSBs in order to avoid compliance risks.

It has become a nationwide trend for financial institutions to close the accounts of their existing customers, which may conduct money services businesses. MSBs are also struggling for survival now. It is obvious that banks need a practical solution to manage their MSB clients, and MSBs need an effective way to earn the trust from their banks.

In this document, the terminology "identification information" generally refers to a set of information that is required to authenticate the identity of a person, an organization or an entity. For example, such information may include the name, address, social security number, employer identification number, driver's license number, the number of the article of incorporation, date of birth, date of incorporation, etc.

In this document, the terminology "network" or "networks" generally refers to a communication network or networks, which can be wireless or wired, private or public, or a combination of them, and includes the well-known Internet.

In this document, the terminology "computer system" generally refers to either one computer or a group of computers, which may work alone or work together to reach the purposes of the system.

In this document, a "bank" or "financial institution" is generally referred to as a financial service provider, either a bank or a non-bank, where financial services are provided.

Reference should also be made to our co-pending application entitled "Dynamic Multidimensional Risk-Weighted Suspicious Activities Detector," which is hereby incorporated in its entirety.

SUMMARY OF THE INVENTION

The present invention may be used to help businesses and their associated financial institutions comply with good business practices, including compliance with certain regulatory requirements and applicable laws.

To that end, one or more shared computer systems may be made accessible to all participating businesses via a network (e.g., the Internet), which may be used to process transactions associated with the connected businesses.

These shared computer systems may then monitor, detect and help these businesses investigate and file regulatory reports in compliance with the regulatory requirements and applicable laws. In addition, it may enhance credibility and accountability by keeping a history record that established compliance with applicable regulations and laws.

In a preferred embodiment, the computer system will issue an identification number, code, index, certificate or other record for each transaction it has processed, which can be used by the businesses to prove that the associated transaction has been monitored and processed by the computer system in accordance with regulatory requirements and applicable laws. As a result, a financial institution can log into the computer system via a network to verify whether any specific transaction handled by a business has been processed by the computer system.

If the identification number, code, index, certificate or record submitted by a business does not match the record inside the computer system, the financial institution may have to investigate this case separately, which may lead to filing a SAR according to the guideline issued by the government. The process of verifying the identification number, code, index, certificate or record can be accomplished by a manual process or by a computer.

In one embodiment, the computer system can provide accounting capabilities and managerial reports so that these business owners can easily conduct and manage their businesses.

In another embodiment, a government agency can log into the computer system to study or analyze the activities of any specific business or its clients.

This invention thus has the potential not only for providing an effective and efficient mechanism for business owners to conduct business but also for helping financial institutions monitor and manage their business clients in compliance with various regulations and laws.

Figure 1:
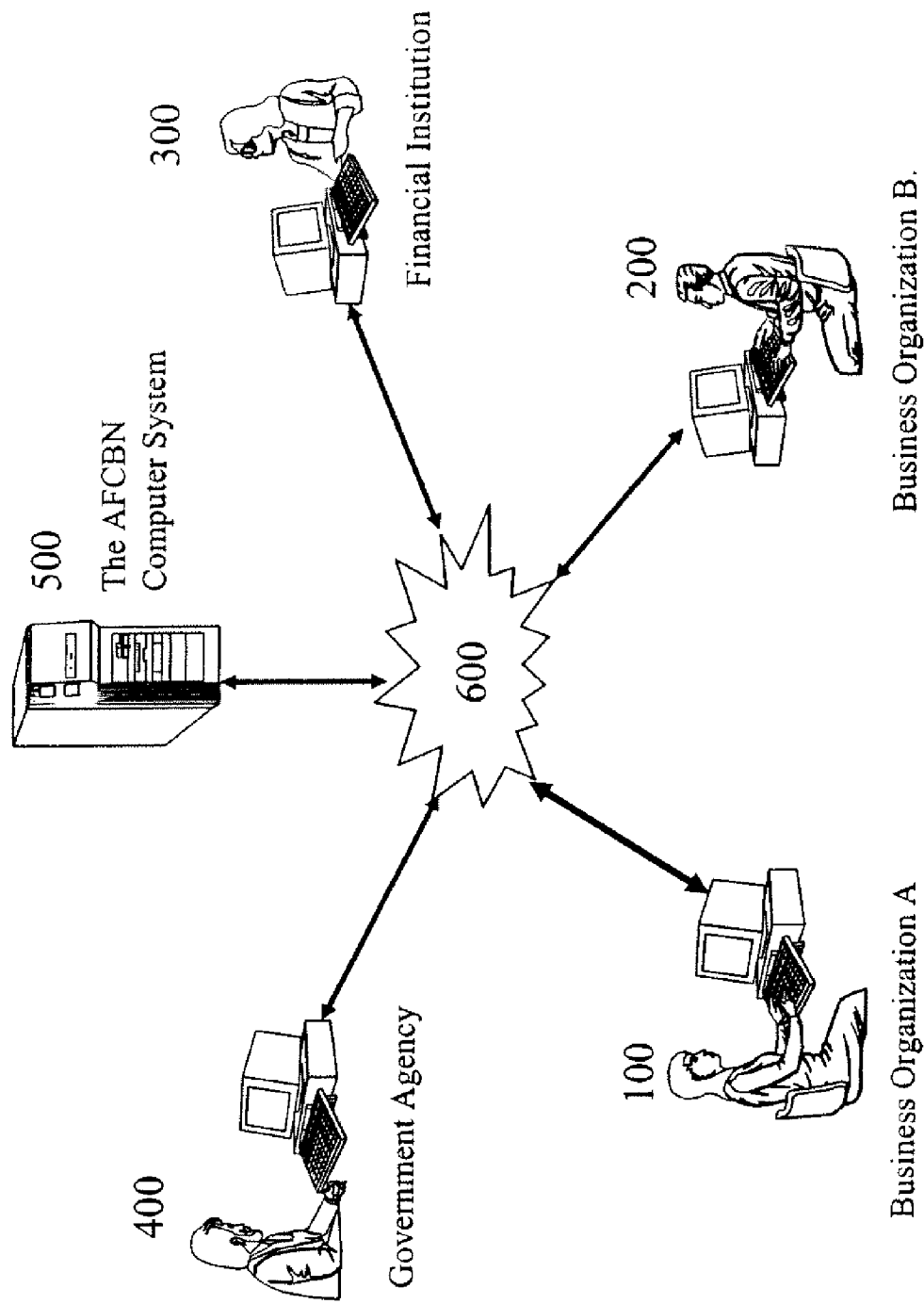
FIG. 1 is an exemplary system diagram with four parties connected to the computer system of Anti-Financial Crimes Business Network ("AFCBN") via a network.

DETAILED DESCRIPTION OF CERTAIN PREFERRED EMBODIMENTS AND COMBINATIONS OF EMBODIMENTS

The present invention potentially includes a number of embodiments to provide maximum flexibility in order to satisfy many different needs of both sophisticated and unsophisticated users. Accordingly, only a limited number of examples of certain preferred embodiments and combinations of those embodiments will now be described.

For purpose of easy explanation, it will be assumed that the business client is an MSB. However, the described embodiments may be readily modified for use with other kinds of businesses which have to comply with the regulatory rules and requirements issued by the government.

The US government requires an MSB to file a Currency Transaction Report ("CTR") with the government agencies if any person or organization has one of multiple cash transactions with an aggregate amount of more than $10,000 during the same day.

Furthermore, an MSB has to file a Suspicious Activity Report ("SAR") with Financial Crimes Enforcement Network ("FinCEN") if any person or organization has suspicious activities, including an activity that is used to avoid the filing of a CTR. For example, if any person or organization has an aggregate amount of cash transactions of $9,999 on the same day, there is no need to file a CTR. However, it is certainly suspicious.

In addition to filing CTRs or SARs, MSBs have to check their clients against the blacklists, such as the OFAC list, published by the government. If the person or organization that is conducting a transaction or the beneficiary of a transaction is on the blacklist, the MSB may have to hold the money on behalf of the government and report the case to the government agencies right away. Many other governments outside the US have similar regulatory requirements.

MSBs depend on financial institutions as the ultimate channels to complete financial transactions. For example, MSBs need financial institutions to clear the checks they have received from their clients as a result of check cashing activities. Therefore, each MSB is a client of one or more financial institutions.

If an MSB does not fulfill its obligation to file CTRs and SARs, or does not check its clients or beneficiaries of transactions against the government blacklists before completing the transactions, its financial institution has the obligation to report this MSB to FinCEN through filing a SAR.

For convenience, we will classify MSBs as the "Level 1 Clients" of financial institutions; we will classify the customers of MSBs as "Level 2 Clients" of financial institutions.

Obviously, it is extremely difficult for financial institutions to manage MSBs in order to comply with the regulatory requirements or applicable laws because financial institutions have no idea what has been transacted between their Level 1 Clients and Level 2 Clients.

A special purpose "Anti-Financial Crimes Business Network" or "AFCBN" is preferably established using conventional computer and network technology, onto which an MSB can login to conduct transactions for its clients.

In one embodiment, once a user (e.g., an MSB) logs into the computer system of AFCBN remotely, the user can enter the identification information of the client who is conducting transaction with the MSB, the type of the transaction, and the transactional details such as dollar amount, beneficiary's identification information, etc.

The typical type of money services transactions includes check cashing, cash advance, payroll advance, fund transfer, foreign current exchange, purchase of monetary instruments and stored value cards, etc.

To save time, in another embodiment of the present invention, a user can read the identification information of the user's customer by scanning an official identification document such as driver's license, passport, etc. through an electronic, magnetic, or optical reader.

Similarly, in other embodiments, a user can read the transactional information by scanning the MICR, bar code, or other equivalent information which is often associated with checks, monetary instruments, stored value card, etc.

The computer system of AFCBN will automatically compare the customer's identification information and that of any involved counterparty to the transaction in question against the blacklists published by the government. If there is a match, the user is advised to take an appropriate action according to the government guideline. If there is no match, the computer system will automatically create a record, which can be used for accounting and regulatory compliance purposes.

For example, if any customer has conducted cash transactions with an aggregate amount of more than $10,000 on the same day, the computer system of AFCBN will produce a CTR for the MSB to file with the government agencies. The user can file a CTR through an electronic, magnetic, or paper format in accordance with the regulatory requirements.

If the computer system of AFCBN detects any suspicious activity about any MSB's customer, the computer system will request the user, an MSB in this example, to review the activity and determine whether to file a SAR or not. If the user decides to file a SAR, the computer system will produce a SAR for the user to file with FinCEN. The user can file a SAR through an electronic, magnetic, or paper format in accordance with FinCEN's requirements.

If the user decides not to file a SAR, the computer system will request the user to enter the reason to justify its decision. A permanent record will be produced in the database of AFCBN for compliance record.

Furthermore, the computer system of AFCBN can process the transactional data to produce accounting records and managerial reports so that the MSB can easily conduct and manage its business.

More importantly, the computer system of AFCBN will assign a Compliance Certification Number ("CCN") to each of the transactions that is processed by AFCBN. A CCN means that AFCBN certifies the fact that the specific transaction has been fully examined and monitored by AFCBN in accordance with regulatory requirements and applicable laws.

A user can write the CCN on the financial instrument (e.g., checks) or register it with the transactional record for future reference.

In one embodiment of the present invention, when a user (e.g., an MSB) intends to deposit checks, which it has collected through providing check-cashing, cash advance, payroll advance services, etc., into a financial institution, the user can request the computer system of AFCBN to print a list of checks with a CCN, dollar amount, check number, the name of the beneficiary, and other information for each check.

When the user brings these checks and the printed list to a financial institution for deposit purposes, the financial institution can verify the validity of the CCN of each check by logging into the computer system of AFCBN directly and reviewing the original record of CCN, which is stored inside the database of AFCBN.

If the CCN is valid, the financial institution knows that this specific transaction has been conducted in compliance with the regulatory requirements and applicable laws. If the CCN is not valid or the MSB cannot provide a CCN for the transaction, the financial institution knows that this MSB may not be in compliance with the regulatory requirement and applicable laws, and the financial institution should further investigate the activities of the MSB according to the guideline issued by the government.

Such a paper based approach may take quite an amount of time and resources from the financial institutions if a large number of checks are involved. To save time and resources, in another embodiment of the present invention, the MSB can submit to its financial institution the list of checks in an electronic file (e.g., on a diskette, CD. DVD, etc.), which is provided by AFCBN. The financial institution can log into the computer system of AFCBN and request it to read and verify the list against its records stored inside the database of AFCBN.

If the list matches the record inside the database of AFCBN, the financial institution knows that this MSB has complied with the regulatory requirements and applicable laws. If the list is not valid or the MSB cannot provide a list, the financial institution may further investigate the activities of the MSB according to the guideline issued by the government.

In an alternative embodiment of the present invention, the MSB can submit to its financial institution a "list identification number," which is issued by AFCBN. The financial institution can log into the computer system of AFCBN and request it to display the list based on the "list identification number" so that it can verify the CCN of each check based on this list.

In yet another embodiment of the present invention, a check can be scanned and identified based on the MICR line so that the reconciliation between CCNs and checks can be automatically resolved.

In another alternative embodiment of the present invention, an MSB can convert these paper checks into electronic fund transfer ("EFT") transactions and each transaction is identified by a unique CCN. Once a financial institution receives these EFT transactions and CCNs, the computer system of the financial institution can communicate with the computer system of AFCBN to verify the validity of these CCNs.

If a user intends to send a wire transfer on behalf of its clients, the wire transfer can be processed in a similar way as a check.

In one embodiment of the present invention, the MSB can request the computer system of AFCBN to print a list of transactions (i.e., with pairs of senders and recipients) with CCNs, dollar amounts, names, and other information. In another embodiment of the present invention, the MSB can submit to its financial institution the list of transactions in an electronic file (e.g., on a diskette, CD, DVD, etc.). The financial institution can log into the computer system of AFCBN and request it to read and verify the list against its records stored inside the database of AFCBN.

in an alternative embodiment of the present invention, the MSB can submit to its financial institution a "list identification number" so that the financial institutions can request the computer system of AFCBN to display the list based on the "list identification number."

In another alternative embodiment of the present invention, an MSB can remotely request the financial institution to conduct a wire transfer transaction by providing a list or "list identification number."

In any of the above embodiments, if the list submitted by the MSB matches the record stored inside the database of AFCBN, the financial institutions knows that this MSB has complied with the regulatory requirements and applicable laws. If any CCN is not valid or the MSB cannot provide a list, the MSB may have failed to comply with the regulatory requirements and applicable laws. The financial institution may consider further investigating the MSB's activities according to the guideline issued by the government agencies.

If an MSB intends to purchase monetary instruments or stored valued cards, or exchange foreign currency from a financial institution in order to provide money services to its clients, in one embodiment of the present invention, a financial institution can request the MSB to provide a list of transaction details and CCNs so that the financial institution can determine whether the MSB has complied with the regulatory requirements.

In another embodiment of the present invention, a user can provide an electronic record of the list to a financial institution so that the verification process can be completed by the computer system of AFCBN.

In an alternative embodiment of the present invention, the user can provide a "list identification number" so that the financial institution can log into AFCBN to verify whether the MSB has complied with the regulatory requirements based on this "list identification number."

In one embodiment of the present invention, for an MSB that already has its own in-house core transactional processing system, a subsystem can be established to interface with these core systems and perform anti-financial crimes measures for the MSB. After performing the anti-financial crimes measures, the subsystem will send the transactional identification information to AFCBN. The computer system of AFCBN issues CCNs for these transactions and make the records available for financial institutions to verify as described above.

In another embodiment of the present invention, a subsystem is established to interface the core transactional system of the MSB and send the transactional details and identification information of the clients and beneficiaries to AFCBN. The computer system of AFCBN will perform anti-financial crimes measures, issue CCNs to these transactions, and make the records available for financial institutions to verify as described above.

In yet another embodiment of the present invention, a core transactional processing system can be established for an MSB. In addition to the business data processing, this core system also performs anti-financial crimes measures for the MSB.

After performing the anti-financial crimes measures, the core system will send the transactional identification information to AFCBN. The computer system of AFCBN shall issue CCNs to these transactions and make the records available for financial institutions to verify as described above.

In another embodiment of the present invention, the core transactional processing system of the MSB will send the transactional details and identification information of the clients and beneficiaries to AFCBN. The computer system of AFCBN will perform anti-financial crimes measures, issue CCNs to these transactions, and make the records available for financial institutions to verify as described above.

In each of the above embodiments, the AFCBN facilitates an MSB to conduct business according to regulatory requirements and applicable laws. Furthermore, it certifies that each of the transactions conducted by the MSB has complied with regulatory requirements and applicable laws so that financial institutions can deal with these "Certified MSBs" without worrying about the regulatory compliance risks.

Figure 2:
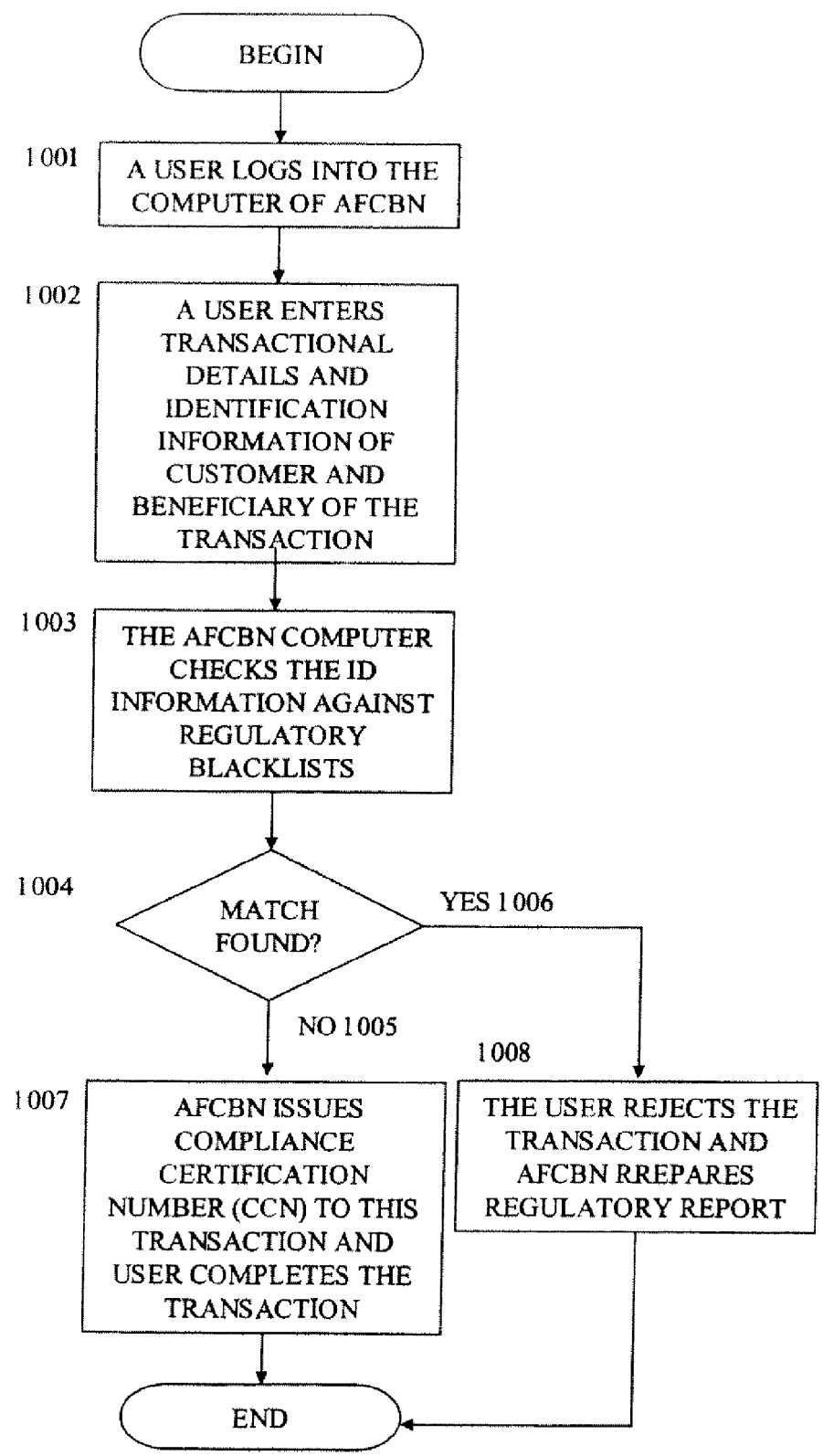
FIG. 2 is an exemplary flow chart showing how a user of a business organization can log into the computer system of AFCBN to conduct a transaction in accordance with regulatory requirements and applicable laws, using the computer system shown in FIG. 1.

References should now be made to the flowchart of FIG. 2 in combination with the system diagram of FIG. 1, which together illustrate how the user of business organization A 100 (e.g., an MSB) logs into the AFCBN computer system 500 to conduct a money service transaction (block 1001) via the network 600.

Then (block 1002), the user of business organization A 100 enters the transactional details and the identification information of the customer and the beneficiary of the transaction into the computer system of AFCBN 500.

The computer system of AFCBN 500 checks the identification information of the customer and the beneficiary against the blacklists according to the regulatory requirements (block 1003).

After the checking against the blacklists, the computer system of AFCBN 500 determines whether there is any match (decision block 1004). If a match is found (YES branch 1006 from decision block 1004), the computer system of AFCBN 500 informs the user of business organization A 100 to reject the transaction (block 1008).

In general, two individual or organizations are classified as "matched" if they have the same identification information.

On the other hand, if no match is found (NO branch 1005 from the decision block 1004), the computer system of AFCBN 500 issues a Compliance Certification Number ("CCN") to this transaction and the user can proceed to complete the transaction (block 1007).

This completes the process of checking the customer and the beneficiary of the transaction against the regulatory blacklists.

Figure 3:
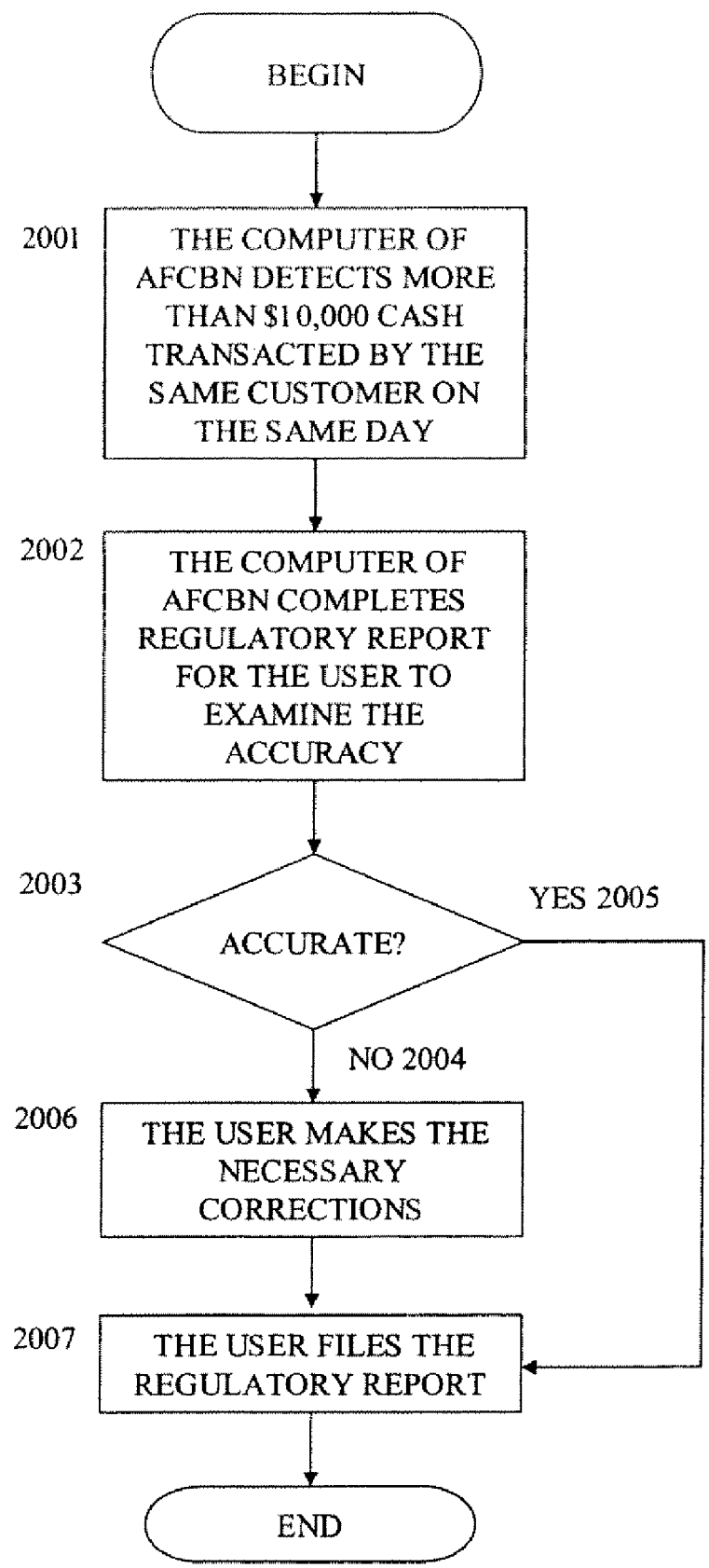
FIG. 3 is an exemplary flow chart showing how the computer system of AFCBN can help a user file regulatory report if the cash transaction amount of a client in one day has exceeded the threshold set by the regulatory requirements (e.g., $10,000 as required by the Bank Secrecy Act), using the computer system shown in FIG. 1.

References should also be made to the flowchart of FIG. 3 in combination with the system diagram of FIG. 1, which together illustrate how the computer system of AFCBN helps the user of business organization A 100 (e.g., an MSB) to detect and file a regulatory report if the aggregate cash amount of a client has exceeded the regulatory threshold on the same day.

First (block 2001), the computer system of AFCBN 500 detects that more than $10,000 cash has been transacted by the same client of the business organization A 100 on the same day.

$10,000 is the threshold used by the US government. Different countries may have different thresholds. We use $10,000 for exemplary purposes only.

Then (block 2002), the computer system of AFCBN 500 automatically completes the regulatory report (e.g., Current Transaction Report used by the US government) based on the information entered by the user of business organization A 100 when he/she conducted the transactions.

The computer of AFCBN 500 requests the user of business organization A 100 to review the accuracy of the regulatory report (decision block 2003).

If it is accurate (YES branch 2005 from the decision block 2003), the user of business organization A 100 files the regulatory report (block 2007).

If it is inaccurate (NO branch 2004 from the decision block 2003), the user of business organization A 100 has to make the necessary correction to the regulatory report (block 2006).

Then (block 2007), the user of business organization A 100 files the regulatory report and the process of detecting and filing regulatory report for business organization A 100 is completed.

Figure 4:
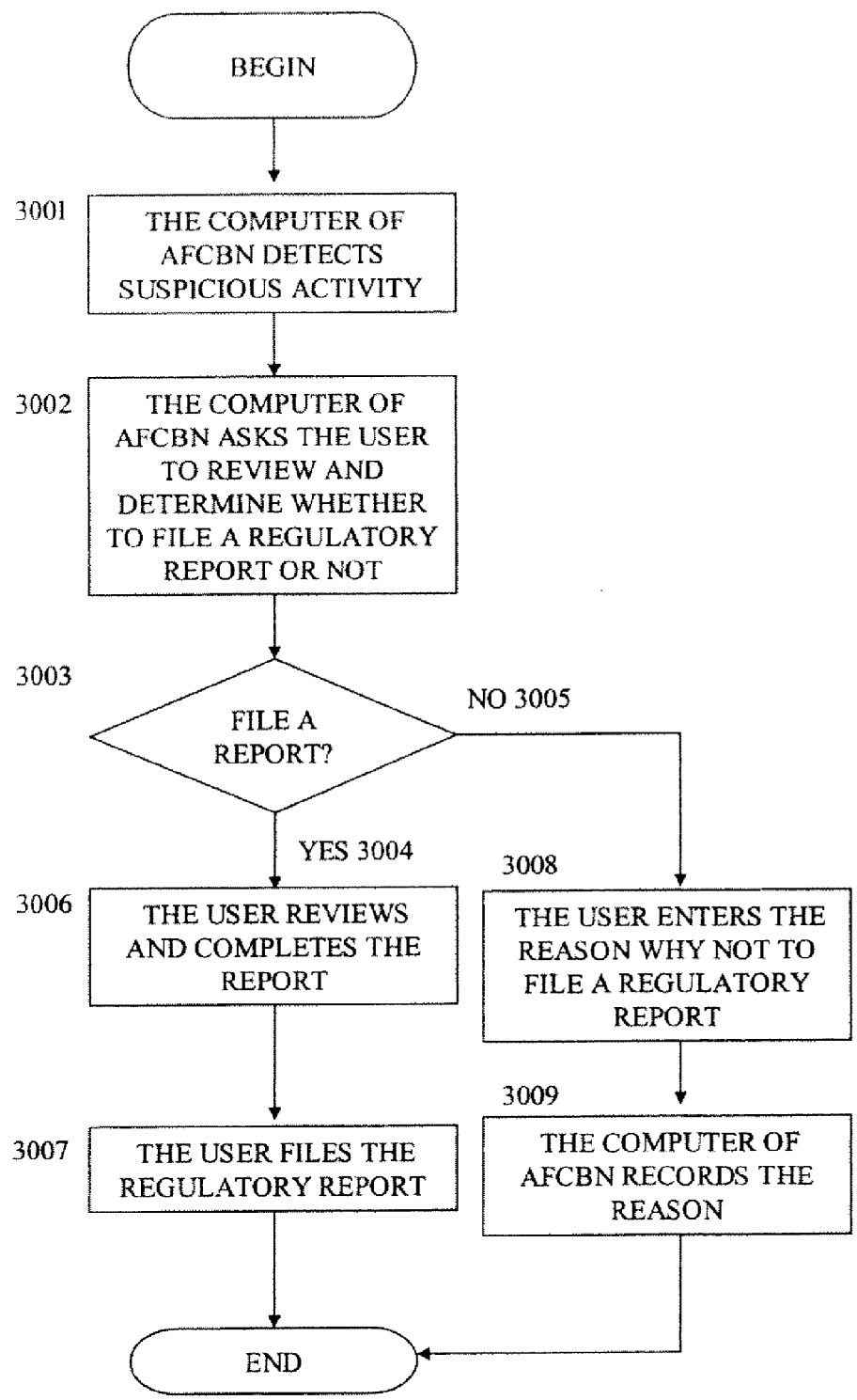
FIG. 4 is an exemplary flow chart showing how the computer system of AFCBN can help a user file a regulatory report if it detects any suspicious activity from a client of the business organization based on the regulatory requirements, using the computer system shown in FIG. 1.

Similarly, references can also be made to the flowchart of FIG. 4 in combination with the system diagram of FIG. 1, which together illustrate how the computer system of AFCBN helps the user of business organization A 100 to detect and file a regulatory report if a suspicious activity is detected.

First (block 3001), the computer system of AFCBN 500 detects a suspicious activity of a client of business organization A 100.

Then (block 3002), the computer system of AFCBN 500 requests the user of business organization 100 to review the activities and determine whether a regulatory report about these suspicious activities should be filed or not.

The user has to make a decision about whether to file this regulatory report or not (decision block 3003).

If the user decides to file a regulatory report (YES branch 3004 from the decision block 3003), the user of business organization A 100 reviews and completes the regulatory report (block 3006).

The user will continue to file this regulatory report (block 3007).

If the user decides to not file a regulatory report (NO branch 3005 from the decision block 3003), the user of business organization A 100 has to enter the reason to justify why he/she does not want to file this report (block 3008).

Then (block 3009), the computer system of AFCBN 500 will record the reason into the database for record, and the user of business organization 100 will be accountable for this decision.

The above process has met the regulatory requirements regarding how to detect and report a suspicious activity.

Figure 5:
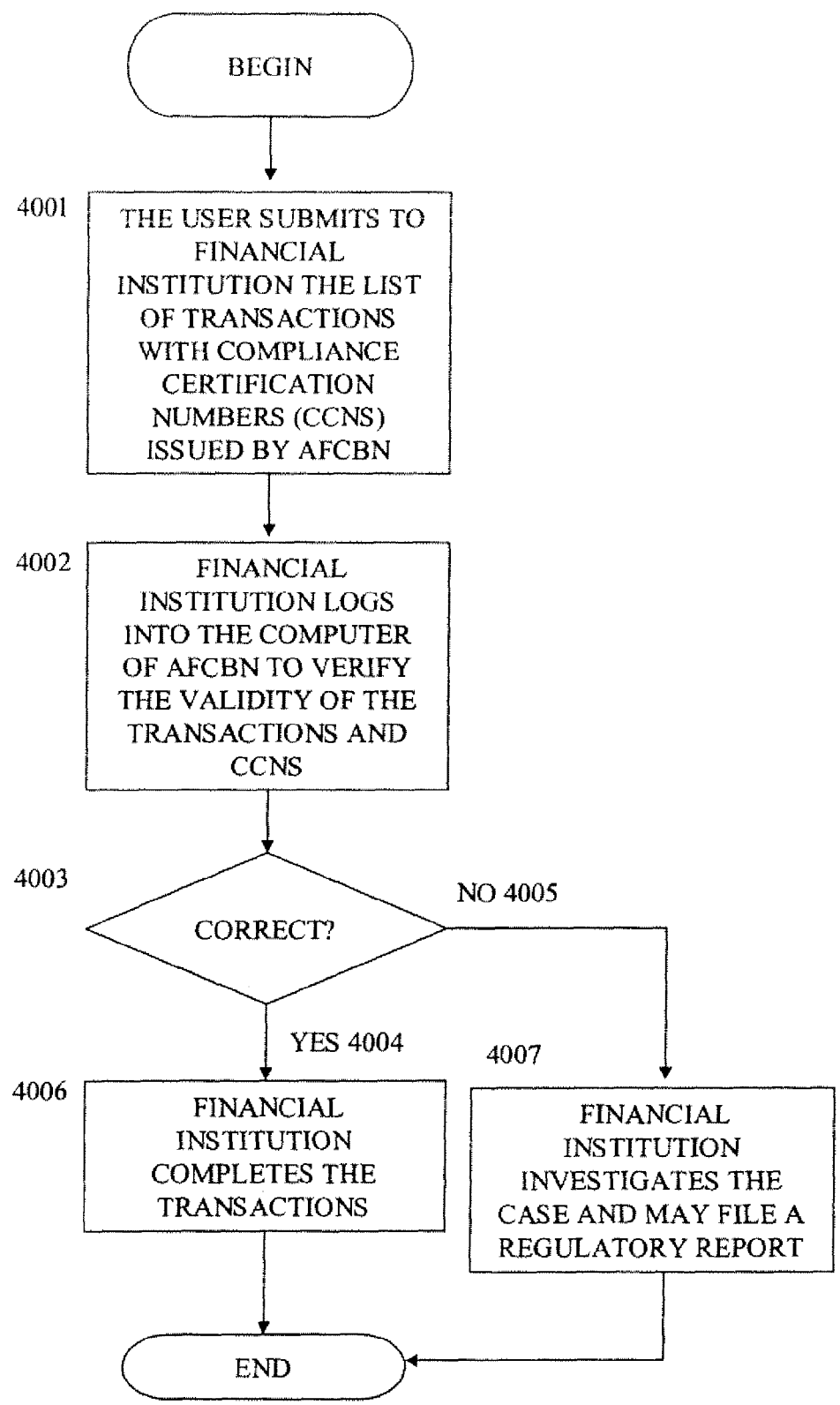
FIG. 5 is an exemplary flow chart showing how the user of AFCBN can conduct a transaction with a financial institution, which can easily verify whether the user of AFCBN has complied with regulatory requirements and applicable laws, using the computer system shown in FIG. 1.

It is also important for a financial institution to monitor and manage its business clients. References can be made to the flowchart of FIG. 5 in combination with the system diagram of FIG. 1, which together illustrate how the computer system of AFCBN helps a financial institution ensure that a business client (e.g., an MSB) has complied with the regulatory requirements and applicable laws via network 600.

First (block 4001), the user of business organization A 100 submits a list of transactions, which require a financial institution to complete. Each of the transactions must have a Compliance Certification Number ("CCN") issued by the computer system of AFCBN.

The list of transactions can be submitted in a paper, electronic, magnetic or optical format.

Then (block 4002), a financial institution 300 logs into the computer system of AFCBN 500 to verify the validity of the transactions and the associated CCNs submitted by the user of business organization A 100.

The verification process can be completed manually or by a computer. The validity of a transaction and a CCN means that this transaction has been certified by the computer of AFCBN 500 to comply with regulatory requirements and applicable laws.

Therefore, the financial institution 300 can make a decision based on the validity of the transactions and CCNs (decision block 4003).

If both the transactions and the CCNs are accurate (YES branch 4004 from the decision block 4003), then the financial institution 300 knows that business organization A 100 has complied with the regulatory requirements and applicable laws.

The financial institution 300 can comfortably complete the transaction for business organization A 100 without worrying about any compliance risk (block 4006).

If any CCN is not valid (NO branch 4005 from the decision block 4003), the financial institution 300 knows that this transaction has not been certified by AFCBN to comply with the regulatory requirements and applicable laws.

Then (block 4007), the financial institution 300 may need to further investigate the activities of business organization A 100 according to the regulatory guideline. If the financial institution verifies that the business organization A 100 did not conduct its business according to the regulatory requirements and applicable laws, the financial institution should file a SAR.

The above process helps a financial institution 300 easily manage its business clients without taking any compliance risk.

A government agency 400 can also log into the computer system of AFCBN 500 via network 600 to study and investigate the activities of any specific business.

Those skilled in the art will undoubtedly recognize that the described embodiments can be assembled in various ways to form a variety of applications based on the need, and that obvious alterations and changes in the described function and structure may be practiced without meaningfully departing from the principles, spirit and scope of this invention. Accordingly, such alterations and changes should not be construed as substantial deviations from the present invention as set forth in the appended claims. For example, the described AFCBN functionality may be incorporated into an existing network, or may be distributed among several different networks. As another example, since multiple businesses and multiple banks may be connected to the same AFCBN network, the AFCBN network is able to combine transactional information received from more than one MSB to detect a suspicious pattern of related activities. Thus, if the same person were to use more than one MSB to process more than $10,000 in cash in a single day, but each MSB processes less than $10,000 for that person, the AFCBN would still be able to alert the involved banks and MSBs about the potentially reportable activities. This could be done even if the involved MSBs were clients of different banks. Similarly, it might be possible for the AFCBN to receive from its various associated financial institutions information about two individual that are both signatories on the same account, or that are signatories on two different accounts (perhaps at two different financial institutions) that are linked by a common signatory or beneficiary. This additional information would enable the AFCBN to detect a suspicious pattern of related activities involving not just multiple MSBs, but also multiple MSB customers and perhaps even multiple financial institutions.

What is claimed is:

1. A computer readable medium tangibly storing a computer program for a financial institution and its business client to facilitate compliance with regulatory requirements and applicable laws, the medium comprising:

code to receive from the business client transactional information corresponding to a financial instrument, identification information of a customer of both the business client and a transaction, and identification information of a beneficiary of the transaction, the financial instrument being associated with the customer;

code to detect a suspicious activity based on the transactional information, the identification information of the customer of the transaction, and the identification information of the beneficiary of the transaction;

code to require the business client to decide whether to file a regulatory report based on the detected suspicious activity;

code to require the business client to provide a reason for not filing when the business client decides not to file the regulatory report;

code to assign a certification code for the financial instrument in response to receiving an indication from the business client of an intent to file the report or the reason for not filing, the certification code and the financial instrument being submitted to the financial institution by the business client, the certification code indicating that the corresponding transaction has been fully examined and monitored in accordance with regulator requirement and applicable laws; and code to verify validity of the certification code when the financial institution processes the financial instrument.

* * * * *